United States Patent [19]
Bartel et al.

[11] Patent Number: 5,054,722
[45] Date of Patent: Oct. 8, 1991

[54] ROAD-RAIL SHUNT

[75] Inventors: James R. Bartel; Dennis S. Lusk, both of Oroville, Calif.

[73] Assignee: Bartel Welding Shop, Oroville, Calif.

[21] Appl. No.: 561,309

[22] Filed: Oct. 22, 1990

[51] Int. Cl.⁵ .................... B61L 1/02; B60L 5/00
[52] U.S. Cl. ........................ 246/126; 191/45 R; 105/72.2
[58] Field of Search .............. 105/72.2, 215.1, 215.2; 191/45 R, 47, 49; 246/125, 126, 127, 128, 129

[56] References Cited

U.S. PATENT DOCUMENTS

| | | | |
|---|---|---|---|
| 1,870,811 | 8/1932 | Jones | 105/215.1 X |
| 2,027,684 | 1/1936 | Fageol | 105/72.2 |
| 2,655,873 | 10/1953 | McDonald | 105/215.2 |
| 2,986,102 | 5/1961 | Cox | 105/72.2 |
| 3,371,623 | 3/1968 | Therrien | 105/72.2 |
| 3,387,064 | 6/1968 | Joy et al, | 246/121 X |
| 3,581,671 | 6/1971 | Hart | 105/72.2 |
| 4,828,452 | 5/1989 | Bolitho | 105/215.2 X |
| 4,979,392 | 12/1990 | Guinon | 246/121 X |

FOREIGN PATENT DOCUMENTS 2536575  2/1977  Fed. Rep. of Germany ...... 104/281

Primary Examiner—Robert J. Spar
Assistant Examiner—Scott L. Lowe

[57] ABSTRACT

A device that attaches to a pneumatic tired convertible rail highway vehicle for the purpose of shunting electrical current of railroad tracks so that the current will actuate signaling devices. The shunt mechanism is actuated by raising and lowering the guide. No other actuation is needed. The shunt mechanism is located between the road wheel and the rail wheel. A wire or carbon brush makes electrical contact and closely follows the guide wheel. The shunt mechanism is mounted on shafts allowing adjustment for the gauge of the track. A reinforcing bar prevents radial twisting of the carbon or wire brush. A spring provides a light constant tension against the carbon or wire brush to insure electrical contact.

4 Claims, 3 Drawing Sheets

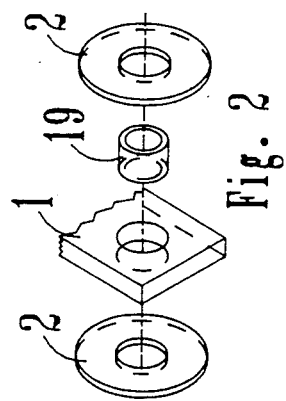
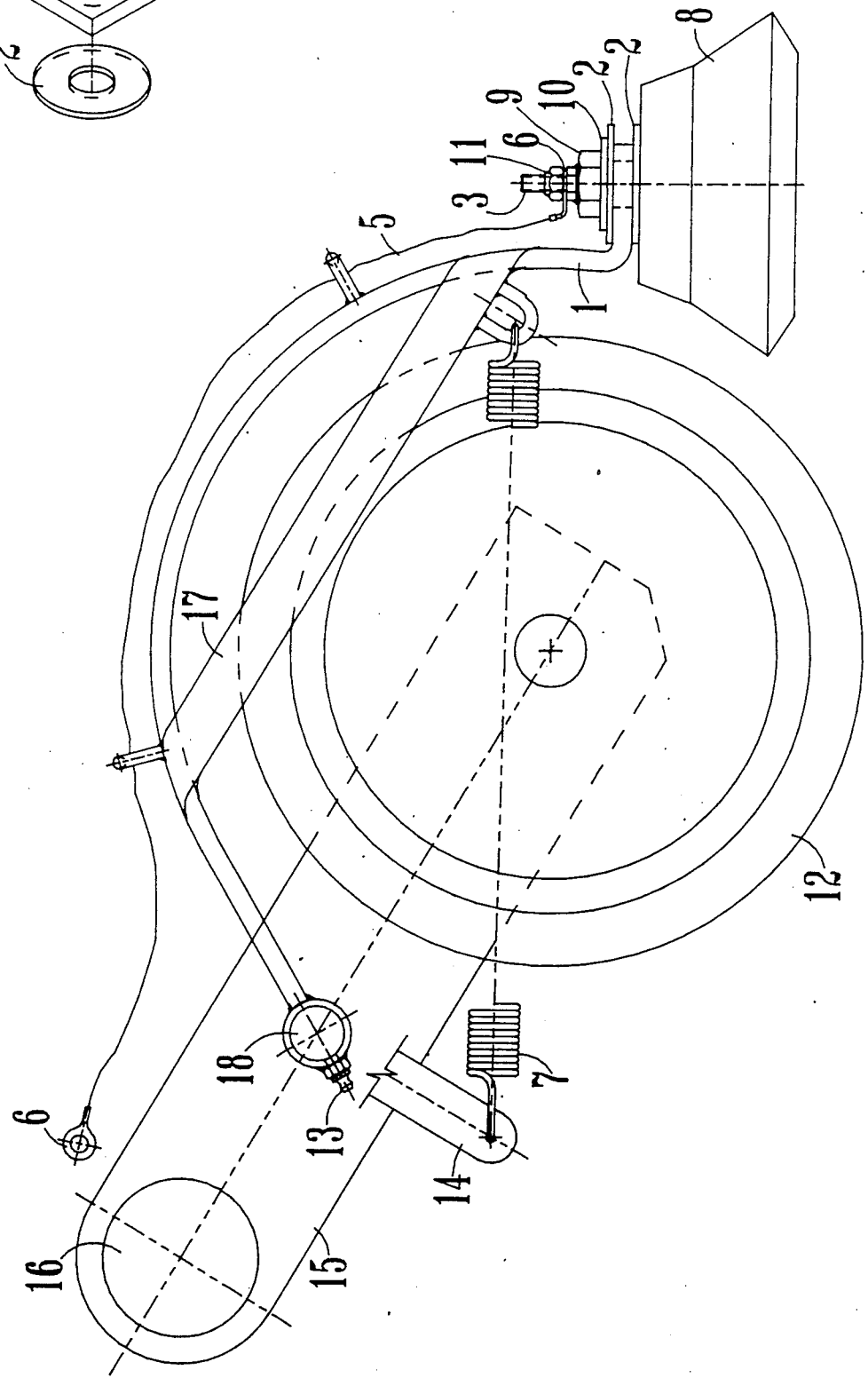
Fig. 1
Fig. 2

ROAD-RAIL SHUNT

FIELD OF THE INVENTION

This invention relates to road type motor vehicles having guide wheels enabling use of the vehicle on railways. Shunts are a device used to short out the signaling current of the rails so that controllers or control devices can locate the position of the vehicle on the rail system.

DESCRIPTION OF PRIOR ART

Shunts previous to this development have had two major forms. The dominant form has been a straight spring design that mounts on the rear of the vehicle, behind the road wheel and the rail guide wheel. This type when at rest is parallel to the rear bumper and swings down when engaged. A pivot point and latch mechanism are attached to the face of the bumper, approximately 18 to 30 inches above the track. The latch must both hold the shunt in the rest position, and in the engaged position. When in the engaged position a spring inside the arm pushes a piston, which has a hard wire cup brush mounted on the end of the piston, against the rail. The spring provides down pressure, the latch prevents lateral movement, and the pivot point drags the brush during movement of the vehicle.

The pivot point being almost directly above the brush and removed by at least 18 inches allows the leverage amplified vibration of the track to wear both the pivot point and latch after very little service. To correct this a hard heavy twisted wire brush is employed along with an excessively heavy spring which impresses a wear pattern in the the brush. This approach compensates for the wear and side play developing in the pivot and latch, but makes installation of replacement brushes difficult as the centering tendency of the brush to follow the track is lessened because of wear in the latch and pivot. Damage often occurs from side play causing the brush to wander off of the rail, especially on curved sections and frogs. The wear pattern in a hard brush has the ends of the wire bent opposite the direction of travel. This wear pattern combined with wear in the pivot points causes intense chatter when the vehicle backs up on the rails.

The second form uses air, electric, vacuum, or hydraulic actuation and sits between the road wheels in the center of the vehicle with the brush units falling close to the rear road wheels. This type has its own peculiar problems and maintenance, (motors, cylinders, wiring, hoses, and switches). This type also employs heavy spring devices that impress a pattern into the brush so that the brush will follow on curved sections of rail.

These prior designs are unsatisfactory because of the excessive time to implement and field maintenance required for these units.

SUMMARY OF INVENTION

This invention provides a shunt design which is automatically engaged when the guide wheels are lowered against the rail. This saves operator time and eliminates mechanical or hand implementation. The brush rubs against the rail closely behind the rail wheel. This eliminates the need for impressing a pattern into the brush so the brush will follow the rail. The pivot is nearly parallel to the axle of the guide wheel and little down pressure is required to close contact against the rail. A soft brush can be used and back up chatter is eliminated.

This improved shunt includes a wire or conductive brush, a curved arm that attaches the brush to the pivot arm, a reinforcing bar to dampen torsional load on the curved arm, a pivot hub, an axle, and a tensioner comprised of either a lever and spring, or a weight on the end of the curved arm. Also included is an electrical insulation point provided by a nonconductive bushing at the pivot point or through the brush attachment point.

DESCRIPTION OF DRAWINGS

FIG. 1 is a view of the right hand side rear wheel of a typical road-rail vehicle taken from the side of the vehicle with the guide wheel in the down position.

FIG. 2 illustrates the insulating washers, bushing, and shunt arm.

DESCRIPTION OF PREFERRED EMBODIMENTS

Figure 3:
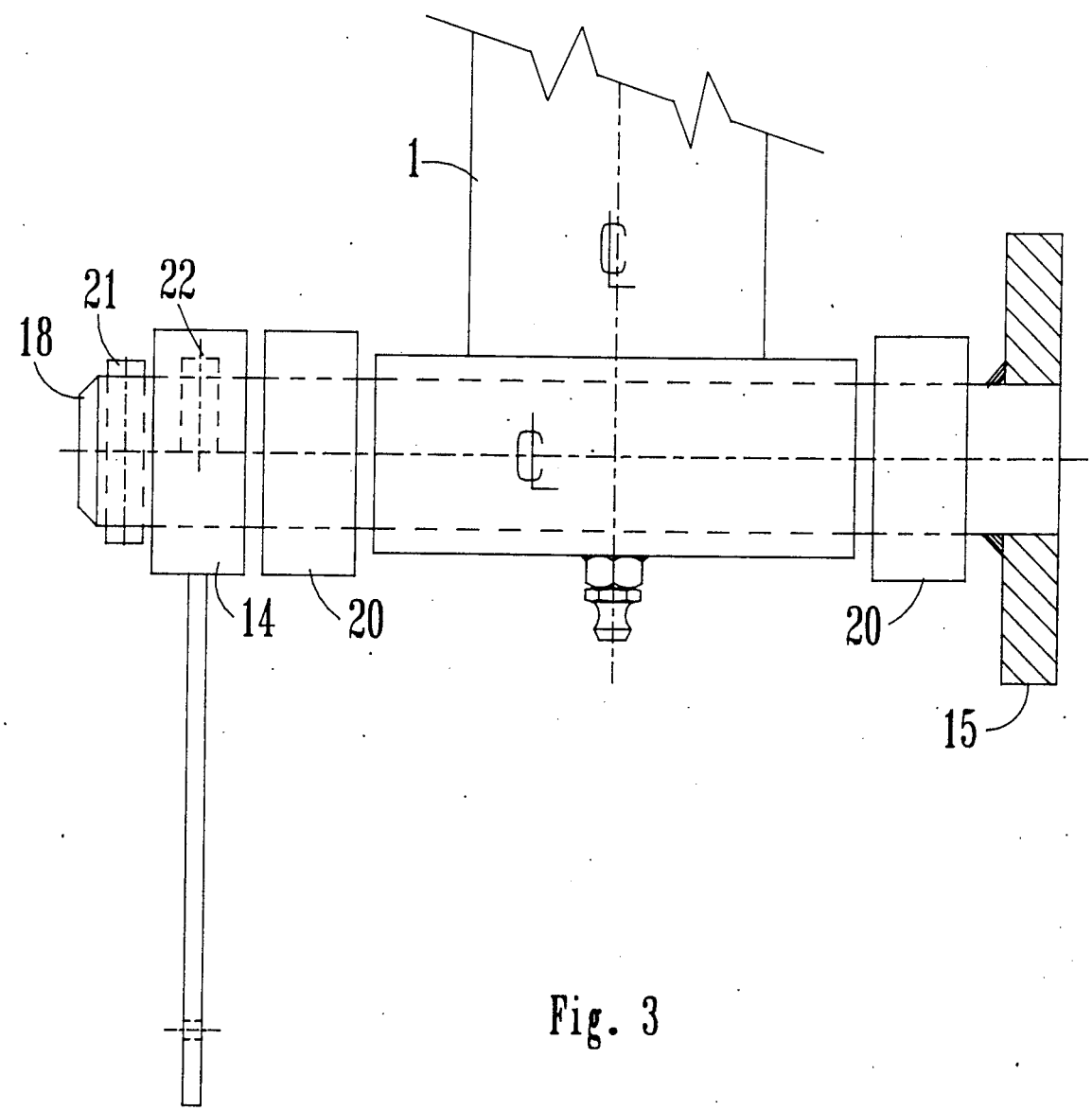
FIG. 3 is an illustration of an axle, locking collars and a spring arm.
Figure 4:
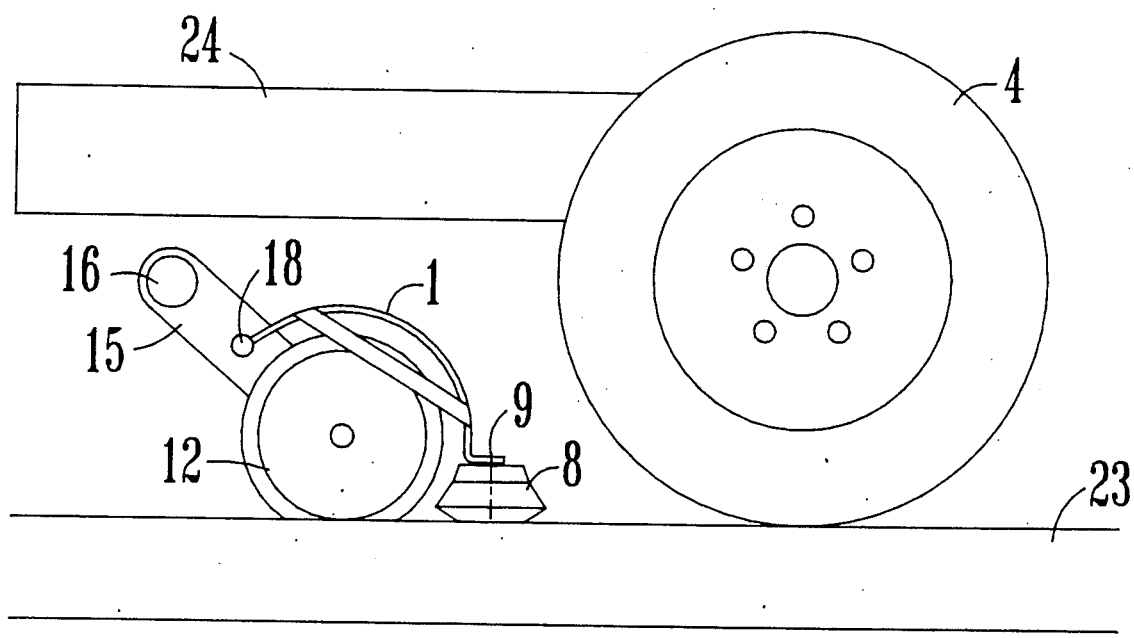
FIG. 4 is a right hand side rear view of shunt and guide wheel in down position on rail.

The improved road-rail shunt illustrated in FIG. 1 is used by maintenance and inspection personnel on light rail, commuter, and heavy railways to activate signaling devices that indicate the position or block which the vehicle occupies. The unit can be fabricated from steel, aluminum, structural plastic or composites. The preferred embodiment is constructed from steel for economy and toughness. The shunt device is attached to a set of guide wheels (right and left), the preferred embodiment utilizes the rear wheels of the vehicle. As shown in FIG. 4 the pivot point of the shunt arm 18 is mounted on the guide wheel arm 15 and when this arm is raised the guide wheel 12 contacts the shunt arm 1 and raises the shunt arm 1 with the guide wheel 12. A variant to this embodiment would be mounting the shunt arm 1 and the guide wheel arm 15 on a common pivot.

The typical improved shunt is comprised of an axle 18 which is bolted or welded to the guide wheel arm 15. Attached to the axle 18 is a curved arm 1 which has a reinforcing bar 17 to stiffen the curved arm 1 and reduce torsional flexing. Two phenolic washers 2 and a plastic bushing 19 insulate the wire brush 8 from the guide wheel arm. The brush 8 is attached to the guide wheel arm by a bolt 9 which passes through the washers 2 and plastic bushing 19 to the brush 8. To the bolt 9 another bolt 3 is welded for attachment of the eyelet 6 with nut 11. Eyelet 6 has a cable 5 attached which is used to complete or close the circuit. Tension on the brush 8 is maintained by a spring 7 which attaches to a curved arm 1 and reinforcing bar 17, and to a second arm 14 which is keyed by a pin 22 to the axle 18. The position of the curved arm assembly is adjusted by positioning locking collars 20 along the axle 18. A roll pin 21 prevents the collars from being pushed off the shaft in an accident. A grease fitting 13 provides lubrication for the axle 18.

The preferred embodiment illustrated may be deviated from in some ways. The spring 7 and second arm 14 could be replaced by attaching a counterweight to the end of the curved arm 1 near the brush 8. The axle 18 could be provided with a nonconductive bushing and insulated at that point. The curved arm assembly 1, 17 could also be lengthened and have a common pivot point 16 with the guide wheel arm 15.

The cable 5 can be attached in three different ways to close the circuit. The cable 5 from each side can be attached to the frame or guide wheel assembly at conductive points. A single wire may be used to attach both terminals 3, 11 together. A switch may be employed by attaching the cable 5 from each side to a switch. Switches are useful in signal maintenance situations where a vehicle occupies the track in heavy road traffic areas and does not need to close traffic gates after the vehicle has arrived at its destination. A switch also gives the ability to the operator to use the shunts as a test device to turn off and on track signals. Using a switch also provides a convenient point to attach a meter to monitor track voltage.

While a preferred embodiment has been illustrated and described it will be apparent to those skilled in the art that many changes can be made without departing from the spirit and scope of this invention.

I claim:

1. An improved shunt device for a road rail vehicle which can be driven both on rails of a railway and off the rails of a railway, comprising;
   an axle fixedly secured to said vehicle,
   a first arm mounted for rotation about said axle,
   said first arm including a guide wheel for engaging one of said rails to aid in guidance of the road-rail vehicle along the rails,
   a curved arm with a reinforcing bar having one end mounted for rotation about said axle and having at the other end a wire brush for engaging said one of the rails of the railway when said vehicle is driven on a railway,
   a second arm and a spring being connected to the device in such a way as to provide a downward force on the brush against said one of the rails of the railway,
   and insulation means disposed in the vicinity of one of the curved arm's ends to resist the flow of electricity through the curved arm.

2. A device according to claim 1 wherein the road-rail vehicle includes a road wheel of the type which is used when said vehicle is driven off the rails of a railway, and wherein said brush is located intermediate said guide wheel and said road wheel.

3. A device according to claim 1 wherein the guide wheel is adapted to be raised and lowered by rotation of the said first arm about said axle and wherein when said guide wheel is raised or lowered, it engages said curved arm to thus cause a corresponding raising or lowering of the brush.

4. A device according to claim 1 wherein said curved arm is adapted to slide over a length of said axle so that said brush may be adjusted in position to accommodate differing gauges of track.

* * * * *